(No Model.)
J. DU SHANE.
BOLT FOR CHILLED MOLD BOARDS.
No. 274,743. Patented Mar. 27, 1883.
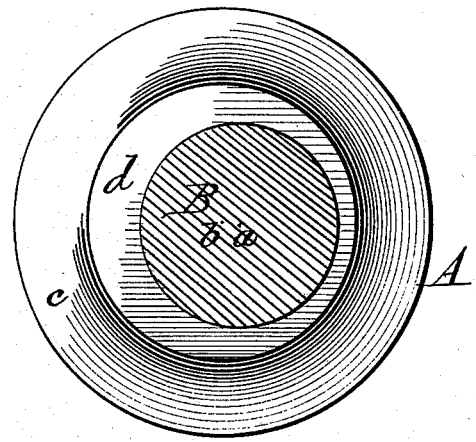
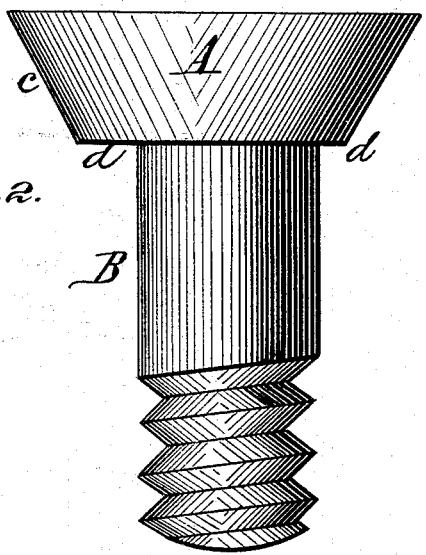
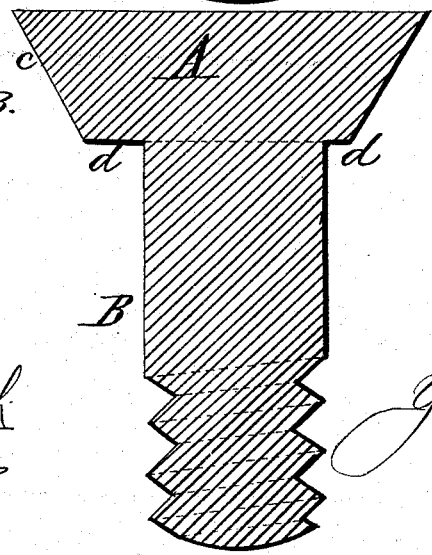
Witnesses:
Phil. C. Dieterich
R. T. Campbell
Inventor:
Jas. Du Shane
by J. H. Alexander
Attorney.

UNITED STATES PATENT OFFICE.

JAMES DU SHANE, OF SOUTH BEND, INDIANA.

BOLT FOR CHILLED MOLD-BOARDS.

SPECIFICATION forming part of Letters Patent No. 274,743, dated March 27, 1883.

Application filed December 2, 1882. (No model.)

*To all whom it may concern:*

Be it known that I, JAMES DU SHANE, of South Bend, in the county of St. Joseph and State of Indiana, have invented certain new and useful Improvements in Bolts for Chilled Mold-Boards; and I do hereby declare that the following is a full, clear, and exact description thereof, reference being had to the accompanying drawings, and to the letters of reference marked thereon, which form part of this specification, in which—

Figure 1 is a cross-section through the shaft of my bolt, looking toward the head. Fig. 2 is a side view of the bolt; and Fig. 3 is a sectional view of the bolt, taken centrally through it.

This invention relates especially to bolts which are designed for chilled mold-boards for plows; and the nature of my invention consists in a bolt having a shouldered conical head, and a shaft which is eccentrically formed on the shouldered end of the head, as will be fully understood from the following description and accompanying drawings.

My improvement is designed, first, to prevent a bolt from turning about its longitudinal axis during the act of applying and tightening the nut; second, to present a circular or conical shaped bearing-surface, so that the corresponding hole in the chilled mold-board of the plow may be cast in the metal without danger of cracking by shrinkage; third, to increase the chances of the bolt passing through the hole in the plow standard or frame, if said hole does not exactly "line" with the hole in the mold-board. These results I accomplish by making the shaft B of the bolt eccentric with the head A.

The letter $a$ designates the axis of the shaft B, and the letter $b$ is the center of the circular head A. This head A is the frustum of a cone, and $c$ designates its tapered bearing-surface, which terminates at its smallest end in a flat shoulder, $d$, the plane of which is at right angles to the axis of the shaft of the bolt, which latter is of equal diameter from one end to the other, and has a screw-thread formed on that end farthest from the head, as shown in Figs. 2 and 3.

The eccentricity of the head on the bolt-shaft is clearly shown in Fig. 1, wherein there is a shoulder, $d$, on the head, entirely surrounding the shaft B; but in carrying out my invention the shoulder may be omitted at one side of the shaft.

It is obvious that my bolt will not turn while applying the nut, if the tapered head is once seated in its countersunk hole in the mold-board or other part of the plow which is to be bolted to another part. With bolts having a central shaft any variation in any direction will have to be rectified by the "cold-chisel," which is objectionable in setting up a plow.

Having described my invention, what I claim as new, and desire to secure by Letters Patent, is—

A bolt formed as herein described—that is to say, with a cylindrical shaft of uniform diameter, having on one end a screw-thread and on the opposite end a conical head eccentric to the said shaft, all substantially as set forth.

In testimony that I claim the foregoing as my own I affix my signature in presence of two witnesses.

JAMES DU SHANE.

Witnesses:
SAM H. DU SHANE,
ANDREW ANDERSON.